United States Patent
Morris et al.

(10) Patent No.: US 8,774,072 B2
(45) Date of Patent: Jul. 8, 2014

(54) SYSTEM AND METHOD FOR ADAPTIVE NETWORK TECHNIQUE USING ISOCHRONOUS TRANSMISSION

(75) Inventors: Rodney D. Morris, Calgary (CA); James K. Rooney, Cochrane (CA); Jeffrey Y. K. Fung, Calgary (CA)

(73) Assignee: Garmin Switzerland GmbH (CH)

( * ) Notice: Subject to any disclaimer, the term of this patent is extended or adjusted under 35 U.S.C. 154(b) by 1749 days.

(21) Appl. No.: 11/681,692

(22) Filed: Mar. 2, 2007

(65) Prior Publication Data

US 2007/0206510 A1    Sep. 6, 2007

Related U.S. Application Data

(60) Provisional application No. 60/778,695, filed on Mar. 3, 2006.

(51) Int. Cl.
*G08C 17/00* (2006.01)
*H04H 20/71* (2008.01)
*H04W 4/00* (2009.01)
*H04B 7/212* (2006.01)

(52) U.S. Cl.
USPC ............ 370/311; 370/312; 370/314; 370/348

(58) Field of Classification Search
None
See application file for complete search history.

(56) References Cited

U.S. PATENT DOCUMENTS

| 4,771,426 A | 9/1988 | Rattlingourd et al. ........ 370/102 |
| 5,748,103 A | 5/1998 | Flach et al. .............. 340/870.07 |
| 6,388,997 B1 | 5/2002 | Scott ............................. 370/280 |
| 6,744,375 B1 | 6/2004 | Groos ...................... 340/870.07 |
| 2003/0086442 A1 | 5/2003 | Reynolds et al. ............. 370/503 |
| 2003/0199279 A1 | 10/2003 | Roberts ....................... 455/452.2 |
| 2004/0032350 A1 | 2/2004 | Knapp et al. .................... 341/61 |
| 2004/0032922 A1 | 2/2004 | Knapp et al. .................. 375/356 |
| 2004/0100957 A1* | 5/2004 | Huang et al. .................. 370/390 |
| 2005/0169262 A1 | 8/2005 | Kasper et al. ................. 370/389 |
| 2005/0276255 A1 | 12/2005 | Aiello et al. .................. 370/348 |
| 2007/0054680 A1* | 3/2007 | Mo et al. ....................... 455/502 |
| 2007/0147330 A1* | 6/2007 | Smith et al. ................... 370/346 |
| 2008/0008124 A1* | 1/2008 | Hundal et al. ................. 370/328 |
| 2008/0247376 A1* | 10/2008 | Del Prado Pavon et al. . 370/345 |
| 2009/0253418 A1* | 10/2009 | Makinen ....................... 455/416 |

FOREIGN PATENT DOCUMENTS

WO    WO 2005064863    *    5/2005

OTHER PUBLICATIONS

Di Benedetto, Maria-Gabriella, et al., "Ultra Wide Band Radio in Distributed Wireless Networks", School of Engineering, University of Rome "La Sapienza", pp. 90-130, 2006.

Chong, Chia-Chin, "UWB Direct Chaotic Communication Technology", IEEE Antennas and Wireless Propagation Letters, 4 pages, vol. 4, 2005.

(Continued)

*Primary Examiner* — John Blanton
*Assistant Examiner* — Thinh Tran
(74) *Attorney, Agent, or Firm* — Samuel M. Korte; Mohammad M. Ali

(57) ABSTRACT

A network including a plurality of nodes each configured as transmitters, receivers, or transceivers. At least one of the nodes may be configured to wirelessly transmit a repeating isochronous signal for reception by one or more of the other nodes. The isochronous phase and/or frequency of the repeating isochronous transmission may be variably adjusted to reduce signal interference.

14 Claims, 7 Drawing Sheets

(56) References Cited

OTHER PUBLICATIONS

Chui, Chee-Cheon, et al., "A Synchronizing Scheme for an Impulse Network", UltRaLab, Communication Sciences Institute, USC, IEEE Military Communications Conference, 7 pages, 2004.

ElBatt, Tamer, et al.,"Joint Scheduling and Power Control for Wireless ad Hoc Networks", IEEE Transactions on Wireless Communications, vol. 3 No. 1, 12 pages, Jan. 2004.

Guo, Chunlong, et al., "Low Power Distributed MAC for Ad Hoc Sensor Radio Networks", Berkeley Wireless Research Center, Department of EECS, University of California at Berkeley, 5 pages, 2001.

Gupta, Ashima, et al., "A Survey on Ultra Wide Band Medium Access Control Schemes", Department of Computer Science, University of California, 24 pages, published prior to Mar. 2, 2007.

McCorkle, John, "Ultra Wide Bandwidth (UWB): Gigabit Wireless Communications for Battery Operated Consumer Applications", Freescale Semiconductor Inc., Symposium on VLSI Circuits Digest of Technical Papers, 4 pages, 2005.

Rabbachin, Alberto, et al., "A Low Cost, Low Power UWB Based Sensor Network", Centre for Wireless Communications, University of Oulu, International Workshop on Wireless Ad-Hoc Networks, pp. 84-88, 2004.

Ryckaert, Julien, et al., "Ultra-Wide-Band Transmitter for Low-Power Wireless Body Area Networks: Design and Evaluation", IEEE Transactions on Circuits and Systems—I: Regular Papers, vol. 52, No. 12, 11 pages, 2005.

Shorabi, Katayoun, et al., "Performance of a Novel Selv-Organization Protocol for Wireless Ad-Hoc Sensor Networks", Electrical Engineering Department UCLA, pp. 1222-1226, 1999.

International Search Report and Written Opinion from corresponding International Application No. PCT/IB2007/002871, dated Mar. 14, 2008.

International Preliminary Report on Patentability from corresponding International Application No. PCT/IB2007/002871, dated Sep. 18, 2008.

* cited by examiner

SYSTEM AND METHOD FOR ADAPTIVE NETWORK TECHNIQUE USING ISOCHRONOUS TRANSMISSION

RELATED APPLICATION

The present non-provisional application claims the benefit of U.S. Provisional Application No. 60/778,695, entitled "METHOD AND SYSTEM FOR ADAPTIVE NETWORK TECHNIQUE USING ISOCHRONOUS TRANSMISSION," filed Mar. 3, 2006, which is herein incorporated by reference in its entirety.

BACKGROUND

1. Field

Embodiments of the present invention relate to adaptive network techniques. More particularly, various embodiments of the invention provide methods and apparatuses operable to utilize isochronous transmissions to communicate information between independent network nodes.

2. Description of the Related Art

Wireless communication methods may be employed to enable various discrete devices to exchange information. For example, wireless devices may employ the Bluetooth or Zigbee (IEEE 802.15.4) specifications to transmit and receive information over short ranges. Unfortunately, wireless devices configured to employ Bluetooth, Zigbee, or other wireless specifications and protocols often consume unsatisfactory quantities of power and require relatively complex and expensive microcontrollers due to the complexities and demands of these various specifications and protocols. Consequently, battery powered devices using these protocols typically possess very poor battery life and are not cost effective.

SUMMARY

Embodiments of the present invention solve the above-described problems and provide a distinct advance in the art of adaptive network techniques. More particularly, various embodiments of the invention provide methods and apparatuses operable to utilize isochronous transmissions to communicate information between network nodes.

In various embodiments, the present invention provides a network including a plurality of nodes each configured as transmitters, receivers, or transceivers. At least one of the nodes may be configured to wirelessly transmit a repeating isochronous signal for reception by one or more of the other nodes. The isochronous phase and/or isochronous frequency of the repeating isochronous transmission may be variably adjusted to reduce signal interference. Nodes receiving the repeating isochronous signal may identify its transmission characteristics, such as its phase and frequency, and receive signals according to the identified characteristics to enable low-power operation.

It is to be understood that both the foregoing general description and the following detailed description are exemplary and explanatory only and are not necessarily restrictive of the invention claimed. The accompanying drawings, which are incorporated in and constitute a part of the specification, illustrate embodiments of the invention and together with the general description, serve to explain the principles of the invention.

BRIEF DESCRIPTION OF THE DRAWING FIGURES

Various embodiments of the present invention are described in detail below with reference to the attached drawing figures, wherein.

Figure 1:
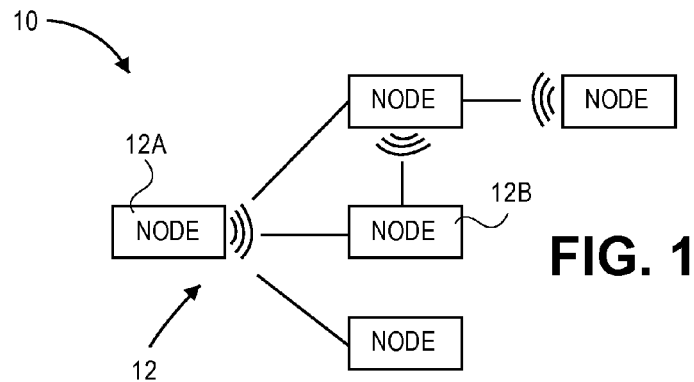
FIG. 1 is a block diagram illustrating a plurality of network nodes configured in accordance with various embodiments of the present invention.

The drawing figures do not limit the present invention to the specific embodiments disclosed and described herein. The drawings are not necessarily to scale, emphasis instead being placed upon clearly illustrating various embodiments of the invention.

DETAILED DESCRIPTION

The following detailed description of various embodiments of the invention references the accompanying drawings which illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Various embodiments of the present invention provide a wireless network 10 including a plurality of network nodes 12. One or more of the nodes 12 may be configured to wirelessly transmit a repeating isochronous signal for reception by one or more of the other nodes 12. The isochronous phase and/or isochronous frequency of the repeating isochronous transmission may be variably adjusted to reduce signal interference.

Figure 2:
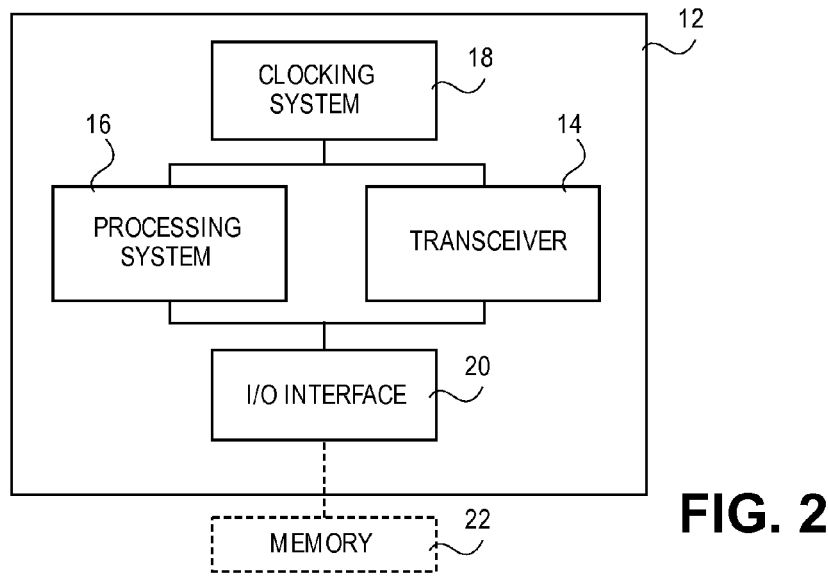
FIG. 2 is a block diagram illustrating some of the components of one of the nodes illustrated in FIG. 1.

In various embodiments as shown in FIG. 2, each node 12 may include a transceiver 14, a processing system 16 coupled with the transceiver 14, a clocking system 18 coupled with the transceiver 14 and/or processing system 16, and an input/output interface 20 coupled with the transceiver 14 and/or processing system 16. The transceiver 14, processing system 16, clocking system 18, and interface 20 may be disposed within a common housing or separately positioned within two or more housings.

The transceiver 14 may include any element or combination of elements operable to receive a transmitted signal for use by the processing system 16. In various embodiments, the transceiver 14 includes an antenna and associated signal processing circuitry to enable the transceiver 14 to receive signals corresponding to desired frequencies. The transceiver 14 may be operable to be tuned to correspond to particular transmission frequencies. For instance, the processing system 16 may control the transceiver 14 to receive transmitted signals having a desired frequency.

In some embodiments, the transceiver 14 may also include power control circuitry to enable the transceiver 14 to be easily activated and deactivated. For example, the processing system 16 may be operable to provide an activation signal to the transceiver 14 to activate the transceiver 14 and provide a deactivation signal to the transceiver 14 to deactivate the transceiver 14. When activated, the transceiver 14 is operable to receive transmitted signals. When deactivated, the transceiver 14 provides less than full functionality and may be generally inoperable to receive transmitted signals. Consequently, the transceiver 14 may be easily activated and deactivated to conserve node power when it is not necessary to receive a signal.

In some embodiments, the transceiver 14 may additionally or alternatively be operable to transmit signals, as is discussed in more detail below. Thus, each one of the nodes 12 and its corresponding transceiver 14 may be configured as a receiver operable to receive signals, a transmitter operable to transmit signals, or a transceiver operable to transmit and receive signals. The transceiver 14 may include discrete receiving and transmitting elements such that it does not necessarily form an integral unit. In some embodiments, the transceiver 14 may be configured to dynamically switch between receiving and transmitting functions to conserve power. For example, the processing system 16 may provide various control signals to the transceiver 14 to enable and disable receiving and transmitting functionality based on the needs of one or more of the nodes 12.

The transceiver 14 may also be configured to receive more than one signal simultaneously such as through the inclusion of a plurality of receiving elements. Additionally, the transceiver 14 may be configured to transmit more than one signal simultaneously such as through the inclusion of a plurality of transmitting elements. Further, the transceiver 14 may simultaneously transmit and receive a plurality of signals based on various control signals provided by the processing system 16.

The processing system 16 is coupled with the transceiver 14 and may be generally operable to control the functionality of the transceiver 14 and process signals acquired by the transceiver 14. The processing system 16 may include various analog and digital components operable to perform these and the various other functions discussed herein. In some embodiments, the processing system 16 may include a microprocessor, a microcontroller, a programmable logic device, digital and analog logic devices, computing elements such as personal computers, servers, portable computing devices, combinations thereof, and the like. In embodiments where the nodes 12 are configured as low-power devices, the processing system 16 may be configured as a low-power programmable logic device, microcontroller, microprocessor, and the like.

The processing system 16 may also include, or be operable to couple with, a memory 22. The memory 22 may include any computer-readable memory or combination of computer-readable memories operable to store data for use by the processing system 16. For instance, the memory 22 may be operable to store isochronous signal information, isochronous frequency and phase information, information corresponding to received and transmitted signals, combinations thereof, and the like.

The processing system 16 may be discrete from the transceiver 14 and other elements discussed herein. However, in some embodiments, the processing system 16 may be integral with the transceiver 14. For example, a single integrated circuit may embody both the transceiver 14 and processing system 16. Further, the functionality of the transceiver 14 and processing system 16 may also be distributed between several elements, such as between a plurality of integrated circuits or discrete digital and analog components. The processing system 16 may additionally or alternatively be integral with the clocking system 18 or interface 20 to reduce the physical size associated with each node 12.

The clocking system 18 is operable to couple with the transceiver 14 and/or the processing system 16 to provide a clock signal thereto. In some embodiments, the clocking system 18 may provide similar or identical clock signals to both the transceiver 14 and processing system 16 for use in various signal reception and processing functions. However, in other embodiments, the clocking system 18 may be operable to provide dissimilar clock signals to the transceiver 14 and the processing system 16. For example, the clocking system 18 may provide a first clock signal having a first rate to the processing system 16 and a second clock signal having a second rate to the transceiver 14, where the second rate is greater than the first rate. The clocking system 18 may also be operable to provide a plurality of different clock signals, each having a different rate, to portions of the processing system 16 and transceiver 14. Such a configuration enables portions of each node 12 to operate at high frequencies, such as those required to receive and/or transmit high-frequency signals, while allowing other portions of each node 12, such as the processing system 16, to operate at lower frequencies and thereby conserve power.

In some embodiments, the clocking system 18 may include an independent clock for timing isochronous transmission periods. For example, as is discussed in more detail below, the transceiver 14, other clocks, and other portions of the node 12 may be deactivated to conserve power when it is not necessary for the node 12 to transmit or receive signals. The independent clock may be a low-power element operable to activate at least portions of the transceiver 14 and/or processing system 16 based on one or more utilized isochronous transmission periods. Thus, when the node 12 is not transmitting or receiving signals, only the independent clock may be active to ensure that the node 12 maintains proper timing.

The clocking system 18 may be discrete from the processing system 16 and transceiver 14. However, in some embodiments, the clocking system 18 may be integral with both the transceiver 14 and processing system 16, such as where a first clock source is associated or integrated with the processing system 16 and a second clock source is associated or integrated with the transceiver 14.

The clocking system 18 may comprise any elements or combination of elements operable to generate one or more clock signals. The clocking system 18 may include a plurality of clock elements and systems. In various embodiments, the clocking system 18 includes a digitally controlled oscillator (DCO) to provide one or more clock signals to the various node elements. However, the clocking system 18 may additionally or alternatively include other clock generating elements, such as conventional clocking circuits, crystal clock elements, physical clock elements, combinations thereof, and the like.

The interface 20 allows each node 12 to access various external elements. For instance, in embodiments where the memory 22 is not integral with the processing system 16, the interface 20 allows the processing system 16 and/or transceiver 14 to access the memory 22 to acquire and save data. For example, the interface 20 may include a memory card interface operable to couple with a flash memory card or other common memory elements. In embodiments where the memory 22 is associated with a discrete computing device, the interface 20 allows the processing system to access the computing device and associated memory 22.

The interface 20 may provide wired and/or wireless connections discrete from the reception and transmission capabilities of the transceiver 14. Thus, in some embodiments the interface 20 may provide a serial interface, such as a RS232 interface, a SPI interface, an I2C interface, a parallel interface, a wired network interface such as an Ethernet interface, a USB interface, a cellular interface, a RFID interface, a short-range wireless interface, combinations thereof, and the like. Thus, the interface 20 enables the processing system 16 to easily communicate with external computing, memory, and network devices and systems to send and retrieve information for configuration and communication purposes.

In operation, the network 10 may be configured utilizing the various nodes 12. For instance, one or more of the nodes 12 may be configured to transmit signals, one or more of the nodes 12 may be configured to receive signals, and/or one or more of the nodes 12 may be configured to receive and transmit signals. Each node 12 may provide received and transmitted signals and any information associated therewith to various computing devices, memories, and/or other systems and devices utilizing its respective interface 20.

In various embodiments, a first node 12a may be configured to transmit a repeating isochronous signal. The first node 12a may be operable to transmit repeating isochronous signals according to one or more isochronous phases and isochronous frequencies. "Isochronous signal," as utilized herein, refers to a signal with an isochronous transmission period that is not dependent upon a global or master synchronizing device. "Isochronous phase", as utilized herein, refers to positioning of isochronous transmissions and receptions relative to other isochronous transmissions and receptions, with a similar isochronous frequency on the same node. "Isochronous frequency," as utilized herein, refers to the rate at which a repeating isochronous signal is transmitted and not the frequency of the transmitted signal itself.

For example, the first node 12a may transmit a first repeating isochronous signal having an isochronous frequency of 8 Hz, where the carrier frequency of the transmitted signal may itself be in the 2.4 GHz range. The first node 12a may in addition transmit a second isochronous signal having an isochronous frequency of 8 Hz, where the second isochronous transmission begins repeatedly 50 ms after the first isochronous transmission, providing an isochronous phase difference of 50 ms.

Figure 4:
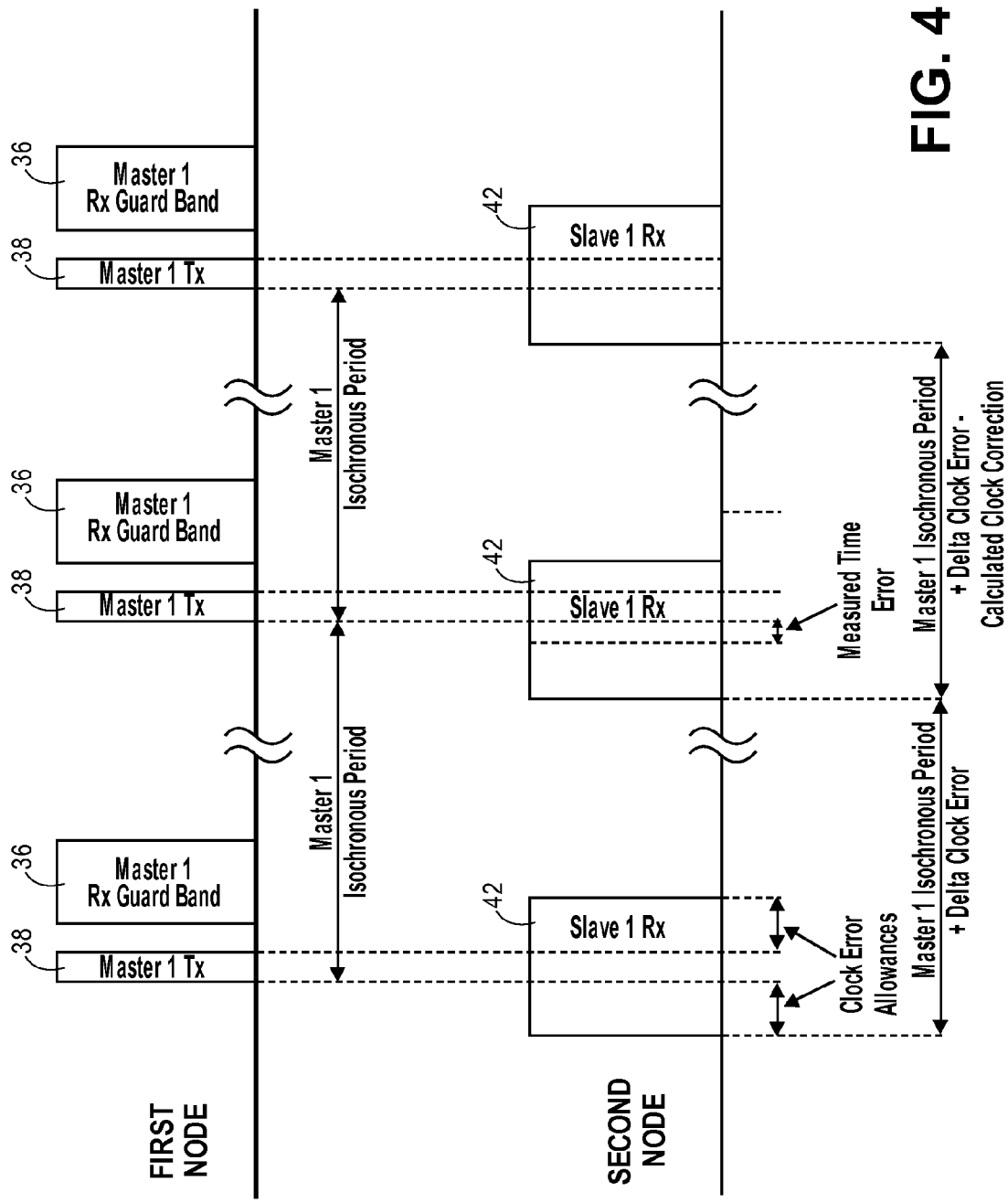
FIG. 4 is a signal diagram illustrating an exemplary transmission of a repeating isochronous signal by one of the nodes of FIG. 1.

The repeating isochronous signals transmitted by the first node 12a may have any isochronous transmission period, isochronous phase, isochronous frequency, and/or other timing or synchronizing characteristics, regardless of the configuration of other devices or nodes 12 associated with the network 10. An exemplary repeating isochronous signal and corresponding isochronous transmission period are illustrated in FIG. 4, where each "Master 1 Tx" indicates a transmission of the repeating isochronous signal.

In some embodiments, the processing system 16 corresponding to the first node 12a is operable to variably adjust a transmission characteristic of the repeating isochronous signal, such as the isochronous phase and/or isochronous frequency of the repeating isochronous signal. Thus, the utilized isochronous phases and isochronous frequencies are not necessarily static values and may be varied by any amount by the first node 12a to achieve any desired effect, including limiting interference and increasing node interoperability.

The processing system 16 or memory 22 associated with the first node 12a may include a list or database of isochronous phases and isochronous frequencies and the processing system 16 may select which isochronous phase and/or frequency to utilize for transmitting the repeating isochronous signal. Utilizing the interface 20, a user may also select which isochronous phase or isochronous frequency to utilize, such as by providing an input or by storing information in the memory 22. In some embodiments, the first node 12a may initially employ a default isochronous frequency and/or isochronous phase and modify the frequency and/or phase as needed, as is discussed in more detail below. The processing system 16 may also randomly select the isochronous phase and/or frequency of the repeating isochronous signal for use in transmitting signals.

In various embodiments, the processing system 16 corresponding to the first node 12a may variably adjust the isochronous frequency and/or isochronous phase based upon various data transmission requirements. For example, the isochronous transmission period may be adjusted to correspond to a maximum message latency. Additionally or alternatively, the isochronous transmission period may be adjusted to correspond to a ratio of data per message to average data bandwidth. Thus, the processing system 16 may dynamically vary the isochronous phase and/or frequency of the repeating isochronous signal to correspond to the specific configuration of the network 10 and/or data being transmitted through the network 10. In some embodiments, the isochronous transmission period is maximized to the greatest extent possible to further reduce power consumption.

In some embodiments, the processing system 16 may vary the isochronous frequency to facilitate the rapid acquisition of transmitted signals and the conservation of power. Thus, a fast isochronous frequency may be used to allow other nodes 12 to rapidly identify transmitted signals and a slower isochronous frequency may be utilized once a signal is acquired by at least one of the other nodes 12.

Figure 3:
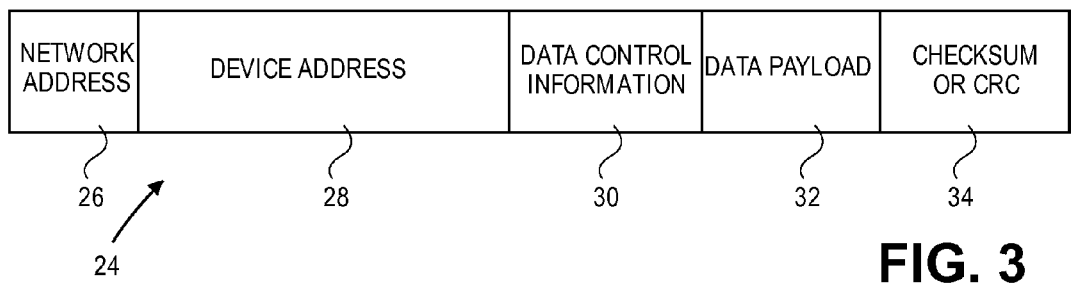
FIG. 3 is a block diagram of an exemplary message format that may be employed by the nodes of FIG. 1.

The transmitted repeating isochronous signal may represent any data or information. Thus, in some embodiments, the transmitted repeating isochronous signal may employ conventional message protocols and formats, such as TCP/IP and/or USB, to relay information to other nodes 12. However, the network 10 and the nodes 12 may additionally or alternatively utilize the exemplary message format 24 illustrated in FIG. 3. The message format 24 may include a network address field 26, a device address field 28, a data control field 30, a data payload field 32, and a checksum field 34.

The network address field 26 allows transmission to be associated with a particular network such as the network 10. For instance, in embodiments where the plurality of nodes 12 form a plurality of networks, the network address field 26 allows the first node 12a to indicate which network should utilize a particular transmitted signal. Further, in some embodiments, the first node 12a may require other nodes to verify or authenticate the network address associated with the network address field 26 before transmitting any information.

Additionally or alternatively, the nodes 12 may be adapted to receive and/or utilize signals having network addresses corresponding to one or more keys provided through the interface 20. For example, a receiving node may compare data retained within the network address field 26 of an isochronous signal to a key retained within the memory 22, and utilize or otherwise provide access to the isochronous signal only if the key matches the data retained within the network address field 26. The key provided through the interface 20 and/or the data retained within the network address field 26 may be encrypted to further secure the network 10.

The device address field 28 may similarly allow the first node 12a to indicate which device or devices should utilize a particular transmitted signal. In some embodiments, the device address field 28 may be divided into sub-fields that represent different categories of device addressing such as manufacturer identification, device type, device number, device version, combinations thereof, and the like. The data control field 30 may be utilized for over-the-air instantaneous control functions such as message control and handshaking.

The data payload field 32 may be utilized to store data and information for use by receiving nodes and devices associated therewith. The data corresponding to the data payload field 32 and transmitted by the first node 12a may correspond to any data or information that may be used by any devices and systems. In some embodiments, the data payload field 32 may be automatically seeded by information stored within the memory 22 or acquired through the interface 20. For example, the first node 12a may be configured as a window alarm sensor that automatically transmits alarm data retained within the memory 22 when activated.

The checksum field 34 allows the integrity of the data comprising a transmitted signal to be checked by any receiving nodes. For instance, the checksum field 34 may employ a cyclical redundancy check (CRC) to ensure that data corresponding to a transmitted signal is not corrupted.

In some embodiments, the first node 12a may additionally be adapted to receive signals, including repeating isochronous signals. For instance, the first node 12a may be adapted to receive transmitted signals from other nodes 12 at any time. However, in some embodiments, the transceiver 14 utilized by the first node 12a is configured by the processing system 16 to receive signals only during a guard window 36.

Thus, as shown in FIG. 4, the first node 12a may be adapted to transmit signals only during a transmission window 38 and receive signals only during a guard window 36. Such a configuration enables the first node 12a to conserve power by only periodically transmitting or receiving. Further, as is discussed in more detail below, the guard window 36 enables other nodes 12 to transmit information to the first node 12a for use in forming a proper and non-interfering repeating isochronous signal. For example, the first node 12a may listen for other transmitting nodes during the guard window 36 and variably adjust the isochronous frequency and/or isochronous phase of the repeating isochronous signal if an interfering signal is detected.

To facilitate the detection of interfering signals, the guard window 36 may be positioned in proximity in time to the transmission window 38. For example, as shown in FIG. 4, the guard window 36 may follow the transmission window 38 to allow the first node 12a to detect transmissions that are likely to interfere with signals transmitted during the transmission window 38. The guard window 36 may additionally or alternatively precede the transmission window 38 or occur at any other time. As is discussed in more detail below, the first node 12a may variably adjust the isochronous phase and/or isochronous frequency of transmitted repeating isochronous signals based on signals received during the guard window 36.

The first node 12a may also receive confirmation signals from other nodes 12 during the guard window 36 to verify that transmitted information was correctly received. In some embodiments, the processing system 16 associated with the first node 12a may be operable to process signals received during the guard window 36 to determine if they are possible interfering signals or appropriate response transmissions by other nodes 12. If the signals received during the guard window 36 may cause interference, the processing system 16 may independently modify the isochronous frequency and/or isochronous phase of the repeating isochronous signal.

Other nodes 12 may also transmit requests to the first node 12a during the guard window 36 to request that the first node 12a change the isochronous frequency and/or isochronous phase of the repeating isochronous signal to prevent interference with other signals. For example, if one of the other nodes 12, such as the second node discussed below, is attempting to simultaneously receive signals from the first node 12a and another node 12, one or more of the nodes 12 may transmit a request to the first node 12a during the guard window 36 to prevent signal interference by requesting a change in the isochronous frequency and/or isochronous phase employed by the first node 12a. Thus, even if the first node 12a is unaware of other interfering signals, or is not adapted to directly detect interfering signals, it may receive requests from other nodes 12 to vary the isochronous frequency and/or isochronous phase of the repeating isochronous signal to limit signal interference.

By transmitting a plurality of repeating isochronous signals, the first node 12a may be operable to establish a plurality of isochronous channels. For example, a first isochronous channel may be established corresponding to a first type of data for use by a first set of nodes 12 and a second isochronous channel may be established corresponding to a second type of data for use by a second set of nodes 12. The first node 12a may transmit signals corresponding to any number of isochronous channels by appropriately defining the isochronous transmission periods, frequencies, and/or phases, for the signals corresponding to each isochronous channel such that the transmission windows 38 for each channel do not overlap. The isochronous transmission periods, frequencies, and/or phases for the various channels may also be defined by the node 12a so as to not conflict with any other device windows, such as the guard windows 36, associated with the first node 12a.

Further, the first node 12a may adjust the power level for the repeating isochronous signals associated with each isochronous channel to manage and control power consumption and spatially reduce interference. Further, nodes 12 receiving transmission from the first node 12a may determine their distance to the first node 12a by monitoring reception over varying power levels. The first node 12a may also vary other characteristics of transmitted repeating isochronous signals, such as amplitude, modulation, duration, combinations thereof, and the like, instead of, or in addition to, modifying the isochronous phase and isochronous frequency of transmitted signals.

The first node 12a may also be adapted to transmit signals over a plurality of carrier frequencies to reduce signal interference and increase the general bandwidth available in the network 10. In some embodiments, the first node 12a may employ carrier frequency hopping methods with one or more of the isochronous channels to provide better system reliability in the presence of radio interference. Although the nodes 12, including the first node 12a, may be configured to utilize any carrier frequency, the 2.4 GHz ISM band may be employed by various embodiments of the present invention.

In embodiments where the network 10 includes a plurality of isochronous channels each having an isochronous transmission period associated therewith, the processing systems 16 corresponding to various transmitting nodes 12, such as the first node 12a, may generate each isochronous transmission to have a different isochronous frequency associated therewith such that the maximum interference period between any two in-phase transmissions will be bounded to a maximum period that is reasonable from an acceptable message loss point of view.

The variable selection of isochronous transmission periods, frequencies, and phases to avoid interference may further prevent inter channel interference as discussed above and may cause all of the isochronous signals associated with the network 10 to drift together in phase due to their relative clock error and independently synchronize to the fastest clock source among the network channels. Such functionality causes the periods of no wireless activity to be maximally long in the network 10, which is beneficial to the establishment of new channels in the network 10.

In contrast, in embodiments where isochronous transmission periods, frequencies, and/or phases are randomly selected, the various clock sources associated with the network 10 may drift apart in phase to cause a sparse channel topology and avoid synchronous interference scenarios. For example, if two nodes transmit signals having the same isochronous characteristics, random adjustments to the isochronous periods, frequencies, and/or phases will prevent the two nodes from remaining synchronously locked together. Thus, the variable adjustment of characteristics associated with the repeating isochronous signal may be used to create either sparse or dense channel spacing topologies and prevent interference caused by the drifting of independent channels over each other.

In various embodiments, the network 10 may include a second node 12b operable to receive one or more transmitted repeating isochronous signals, such as those transmitted by the first node 12a. The transceiver 14 corresponding to the second node 12b may continuously receive all broadcasted signals for storage within the memory 22 or for use by devices and computing elements associated with the second node 12b through the interface 20.

However, to conserve power, in various embodiments the second node 12b may be configured to receive repeating isochronous signals according to identified isochronous transmission periods such that constant and continuous signal reception is not necessary. For instance, the second node 12b may receive a first repeating isochronous signal transmitted by the first node 12a, identify the isochronous transmission period, isochronous phase, and/or isochronous frequency utilized by the first repeating isochronous signal, and continue to receive the first repeating isochronous signal based on the identified transmission characteristic. Thus, by identifying one or more transmission characteristics associated with a repeating isochronous signal, it is not necessary for the second node 12b to continuously attempt to receive transmitted signals.

In some embodiments, the second node 12b may first search for transmissions by other nodes, such as the first node 12a, to enable reception of isochronous transmissions. The second node 12b may automatically search for all accessible transmissions or be adapted to search for transmissions only upon reception of an input, such as information corresponding to a received isochronous transmission and/or information acquired through the interface 20. In some embodiments, the second node 12b may acquire transmissions by other nodes only when the second node 12b first receives a signal indicating that a particular node or isochronous channel is in a discovery state.

The second node 12a may also chose to acquire a detected isochronous signal based on various search criteria in addition to the discovery state discussed above, such as by utilizing information corresponding to the message format 24. For instance, after detecting a signal, the second node 12a may acquire the signal only if the second node 12a identifies that the signal is transmitted by a desired device, device type, or other identifying characteristic, based on information represented by the message format 24. For example, the second node 12a may elect to only acquire signals that correspond to a particular type of heart rate sensor, any heart rate sensor, or a particular heart rate sensor.

Figure 9:
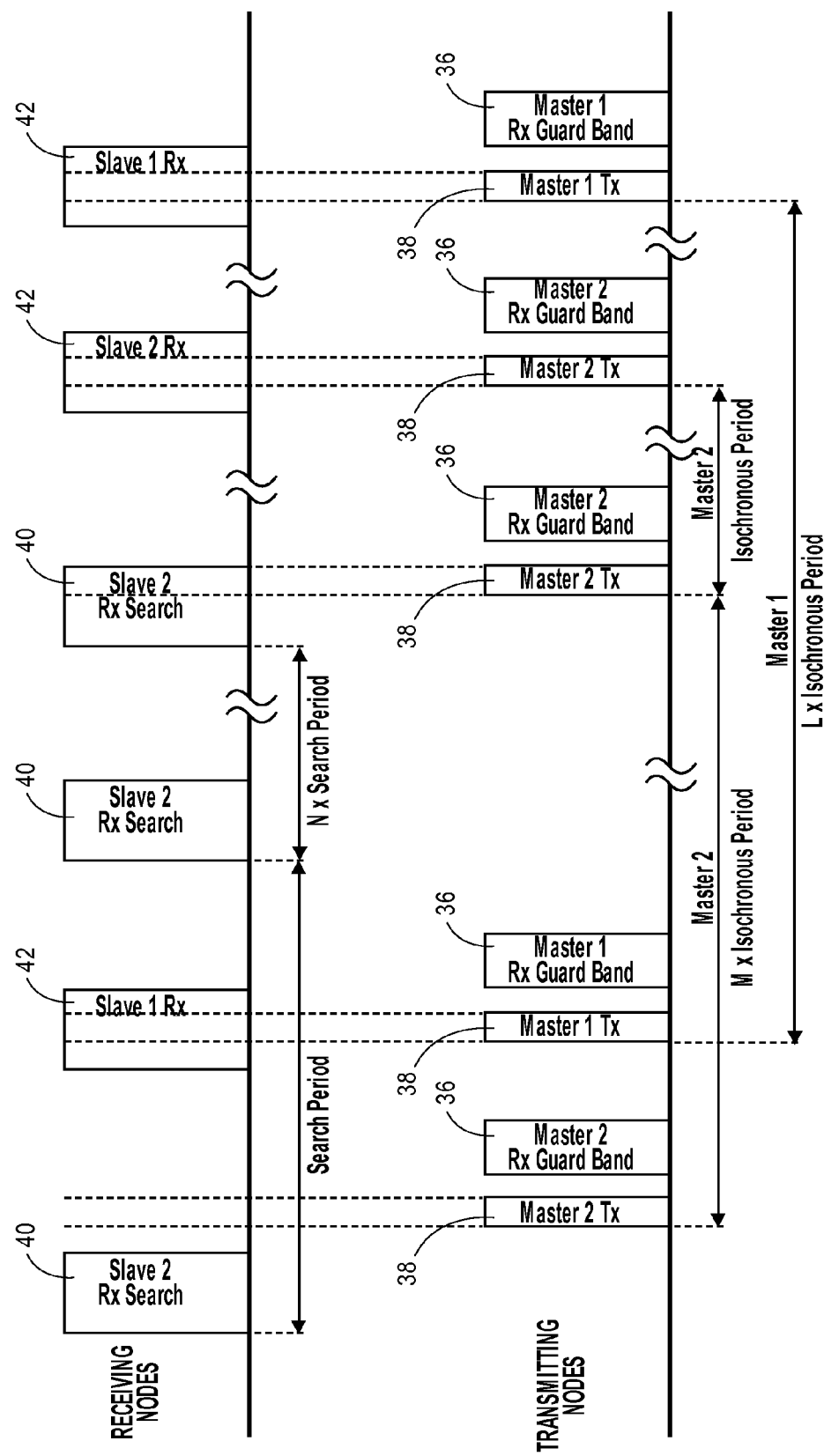
FIG. 9 is a signal diagram illustrating an exemplary channel searching technique operable to be employed by one or more of the nodes of FIG. 1.

The second node 12b may be configured to continuously search for signals until the first isochronous transmission is identified. However, in various embodiments, as shown in FIG. 9, the second node 12b may selectively search for transmitted signals to conserve power. For instance, the processing system 16 associated with the second node 12b may deactivate and activate the transceiver 14 associated with the second node 12b at regular or irregular periods to attempt to acquire a transmitted signal.

In embodiments where the second node 12b is operable to receive and/or transmit more than one signal, or participate in more than one isochronous channel, the second node 12b may be adapted to search for transmissions during periods when other signals are not being received or transmitted such as to not interfere with established communication channels. For example, the processing system 16 corresponding to the second node 12b may selectively activate and deactivate the transceiver 14 to search for signals without interfering with the reception and/or transmission of other signals by the second node 12b.

In some embodiments, the processing system 16 corresponding to the second node 12b may isochronously and selectively activate and deactivate the transceiver 14 to reduce the average current draw of the second node 12b and allows other isochronous signals to be received and/or transmitted by the second node 12b without interference. The duty cycle may comprise a plurality of search windows 40 spaced to beat optimally against an expected isochronous transmission period corresponding to the desired signal or channel. As discussed above, the search windows 40 may be spaced in time such as to not interfere with the reception and/or transmission of other signals by the second node 12b.

After identification and reception of at least a portion of a transmitted repeating isochronous signal, the processing system 16 corresponding to the second node 12b is operable to identify a transmission characteristic, such as an isochronous transmission period, frequency, or phase, corresponding to the received repeating isochronous signal. In some embodiments, the processing system 16 may identify transmission characteristics utilizing information represented by the received isochronous signal. For example, various portions of the message format 24 may correspond to the isochronous transmission period such that the processing system 16 need only process at least a portion of the received isochronous signal to identify the isochronous transmission period corresponding to the signal. However, in other embodiments the processing system 16 is operable to identify the transmission characteristic independent of the data or information represented by a particular signal.

In some embodiments, the isochronous transmission period or other transmission characteristics may correspond to default values such that the second node 12b may have previous knowledge of the transmission characteristics, such as from information stored within the memory 22 or accessible through the interface 20. In such embodiments, the processing system 16 may identify the isochronous transmission period, phase, frequency, or other transmission characteristic by accessing the memory 22 or other devices and systems through the interface 20.

The processing system 16 associated with the second node 12b may also be operable to identify the error in the isochronous frequency, isochronous phase, or other transmission characteristic of a received isochronous signal by determining a difference between an expected time and a time at which the signal was received. As shown in FIG. 4, the processing system 16 may measure the time difference between an expected reception time and an actual reception time and identify the isochronous transmission period, phase, frequency, or other transmission characteristic using the time difference. Thus, by comparing expected or default transmission periods with measured time differences or other variances, the processing system 16 is operable to identify one or more transmission characteristics corresponding to a repeating isochronous signal.

The processing system 16 associated with the second node 12b may also be operable to identify the isochronous transmission period or other transmission characteristics by determining a difference between times at which transmitted repeating isochronous signals are received. For example, the processing system 16 may identify a time at which a first portion of a repeating isochronous signal is received, identify a time at which a second portion of the repeating isochronous signal is received, and then calculate the isochronous transmission period, phase, and/or frequency based on the identified times. Thus, even when a priori information regarding the transmission period is unavailable, the processing system 16 may still identify one or more transmission characteristics.

The processing system 16 may employ any combination of the above methods to identify the isochronous transmission period or other transmission characteristics of received signals. The processing system 16 may additionally or alternatively employ any other characteristic-identifying methods to acquire the isochronous transmission period and other transmission characteristics. For example, the processing system 16 may perform computations based on an identified transmission characteristic to identify the isochronous transmission period, phase, and/or frequency corresponding to a repeating isochronous signal.

Upon identification of the isochronous transmission period or other transmission characteristic corresponding to a received repeating isochronous signal, the second node 12b is operable to continue to receive at least portions of the repeating isochronous signal according to the identified transmission characteristic. In various embodiments, the processing system 16 associated with the second node 12b may be operable to define an activation window 42 corresponding to one or more identified transmission characteristics to conserve node power and enable the second node 12b to receive and/or transmit a plurality of signals.

As shown in FIG. 4, the activation window 42 has a duration that is at least equal to the duration of the transmission window 38 to enable the second node 12b to properly receive transmitted signals. In various embodiments, the activation window 42 has a duration that is greater than the duration of the transmission window 38 to enable signals to be received even if the identified isochronous transmission period is off due to miscalculation, clock error, combinations thereof, and the like. As discussed above, the processing system 16 may utilize these identified errors to modify the isochronous phase and/or isochronous frequency of transmitted signals such that the signals may be received towards the middle of the activation window 42. As the isochronous frequency and/or phase is modified by the first node 12a, the second node 12b is operable to modify the activation window 42 to correspond to the modified isochronous frequency and/or phase.

In some embodiments, the activation window 42 includes error allowances, such as clock error allowances, to compensate for possible errors in the isochronous transmission period, including errors resulting from clock drift over time between transmitting and receiving nodes. However, the activation window 42 may be of any duration suitable for receiving transmitted signals. As shown in FIG. 9, the activation window 42 may be utilized in combination with the search window 40 to enable the second node 12b to alternatively search for and receive signals.

In some embodiments, the processing system 16 may vary the duration of the activation window 42 to allow other signals to be transmitted and/or received without interference. For example, if the second node 12b is receiving many signals, the activation window 42 may be dynamically decreased. If the second node 12b is receiving few signals, the activation window may be dynamically increased. In some embodiments, the processing system 16 may determine the duration of the activation window 42 utilizing error allowances and differences between expected and actual receive times. The processing system 16 may also take into account an acceptable message loss when defining or modifying the duration of the activation window 42. For example, the processing system 16 may multiply the expected worst case drift per message by the acceptable number of lost messages to define the duration of the activation window 42.

In various embodiments, the processing system 16 corresponding to the second node 12b may deactivate and activate the transceiver 14 to conserve node power. For example, the processing system 16 may activate the transceiver 14 at the start of the activation window 42 and deactivate the transceiver at the end of the activation window 42. Thus, the identification of the isochronous transmission period, frequency, phase, and/or other transmission characteristic enables the second node 12b to conserve power through the deactivation of the transceiver 14 when it is not necessary to receive signals.

The second node 12b may receive any number of signals according to the identified isochronous transmission period, phase, frequency, or other transmission characteristics. Further, if a transmission characteristic is varied by the first node 12a or other transmitting nodes 12, the second node 12b may automatically identify the varied transmission characteristic and continue to receive signals based on the varied transmission characteristic.

To further conserve power, the second node 12b may be configured to sub-sample transmissions corresponding to an isochronous channel. Thus, instead of receiving an entire repeating isochronous signal, the second node 12b may elect to receive only a portion of the repeating isochronous signal. For example, the transceiver 14 corresponding to the second node 12b may be activated to receive only on every third period of the repeating isochronous signal. Such functionality enables the second node 12b to consume less energy when it is not necessary to receive an entire signal, such as where portions of a received repeating isochronous signal may be averaged. Further, such functionality enables signals to be transmitted with a fast isochronous transmission period to enable rapid acquisition by the second node 12b while allowing data to be received by the second node 12b at a slower rate to conserve power.

In some embodiments, the second node 12b may be operable to transmit repeating isochronous signals in addition to receiving repeating isochronous signals. In various embodiments, the second node 12b is operable to transmit signals in a substantially similar manner to the first node 12a discussed above. Thus, in some embodiments, the second node 12b may transmit signals during a transmission window corresponding to an isochronous transmission period. The transmission window may be staggered from the activation window 42 and search window 40 discussed above to prevent signal interference and minimize node power. The second node 12b may also be configured to transmit confirmation signals to the first node 12a to indicate that a signal has been received. If the first node 12a fails to receive the confirmation signal, it may automatically retransmit the missing signal. As discussed above, the second node 12b may also transmit requests to the first node 12a to request that a transmission characteristic, such as isochronous frequency or isochronous phase, be modified to prevent conflicts and interference between signals and channels.

In various embodiments, the first node 12a and second node 12b may be configured for relay transmissions. For example, the first node 12a may transmit a repeating isochronous signal, the second node 12b may receive at least a portion of the repeating isochronous signal, and the second node 12b may transmit at least a portion of the repeating isochronous signal. The first node 12a may also be configured to retransmit signals received from the second node 12b. Thus, the various nodes 12 may be configured as repeaters operable to repeat any received signals to extend the range of the network 10.

Figure 5:
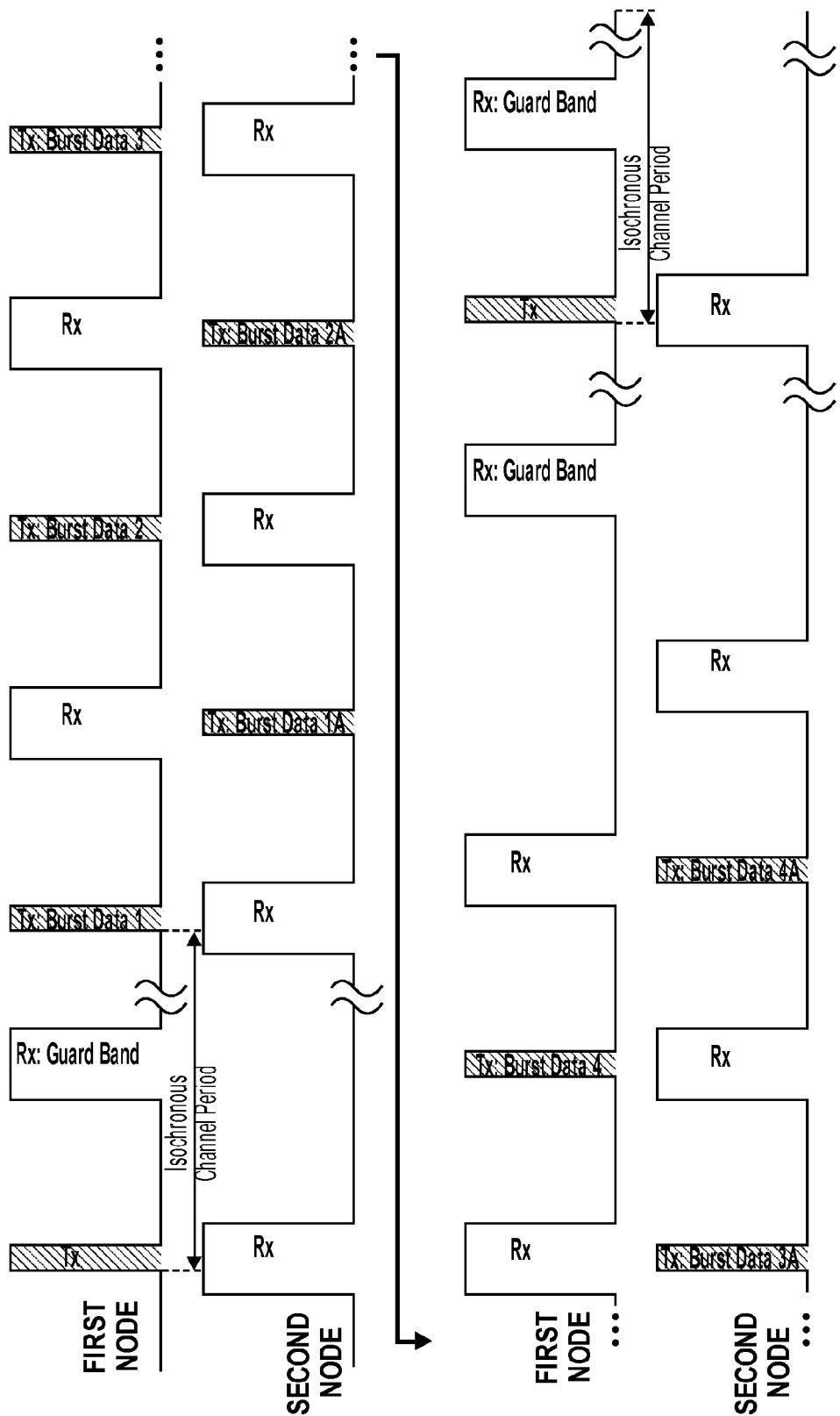
FIG. 5 is a signal diagram illustrating an exemplary burst communication employed by two of the nodes of FIG. 1.
Figure 6:
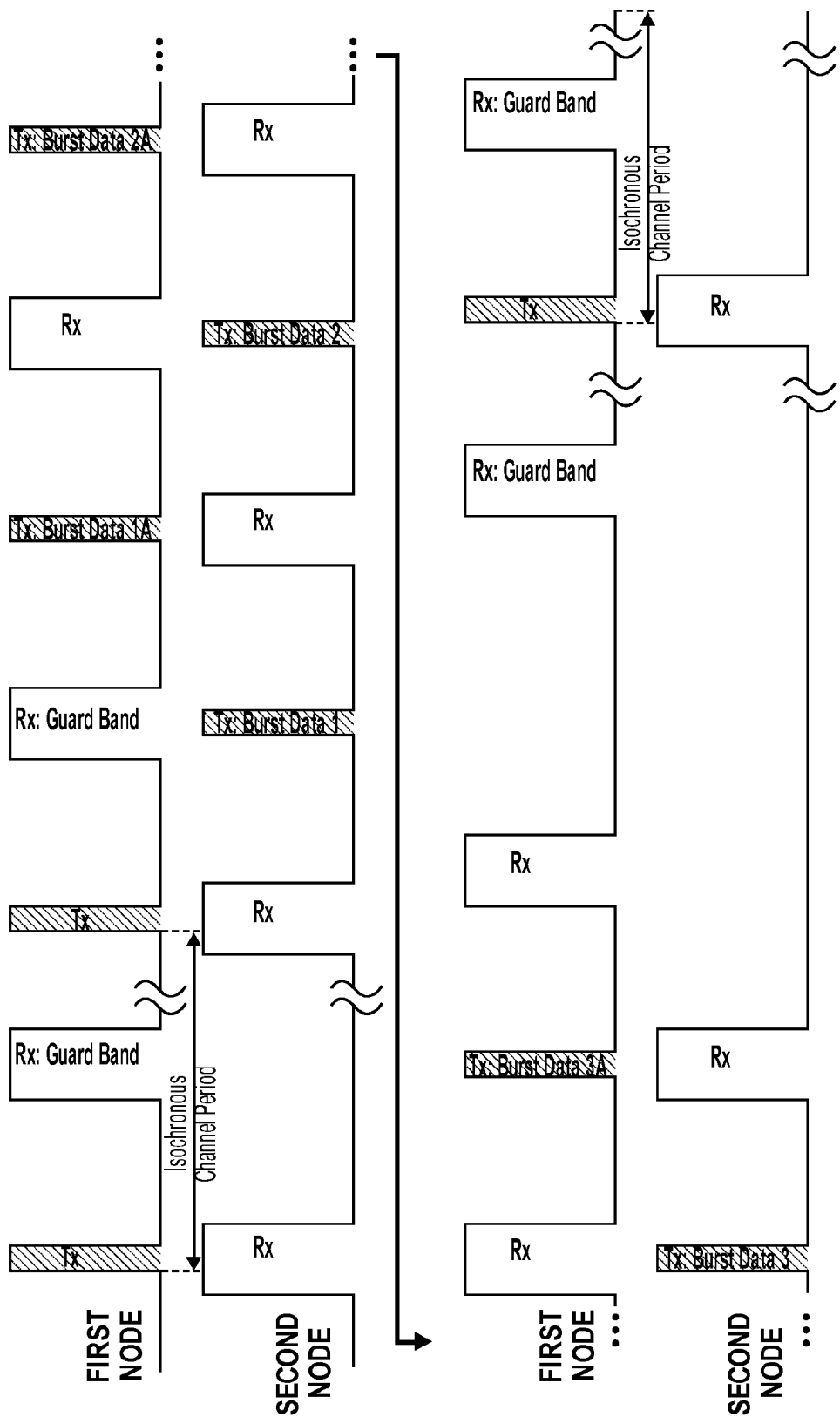
FIG. 6 is signal diagram illustrating another exemplary burst communication employed by two of the nodes of FIG. 1.

In various embodiments, as shown in FIGS. 5 through 8, the first node 12a and second node 12b may be configured for burst transmissions. For example, as shown in FIG. 5, in addition to or instead of a first repeating isochronous signal the first node 12a may transmit a second repeating isochronous signal. Preferably the second isochronous signal has a shorter isochronous period than the first isochronous signal. Thus the second isochronous signal can transfer data at higher rates than the first isochronous signal. When the second node 12b detects that the first node 12a is burst transmitting, the second node 12b may actively adjust the size of its activation window 42 to ensure proper reception of burst transmissions. For example, the second node 12a may actively reduce the size of its activation window 42 and associated error allowances to account for the faster rate of burst transmissions.

Figure 7:
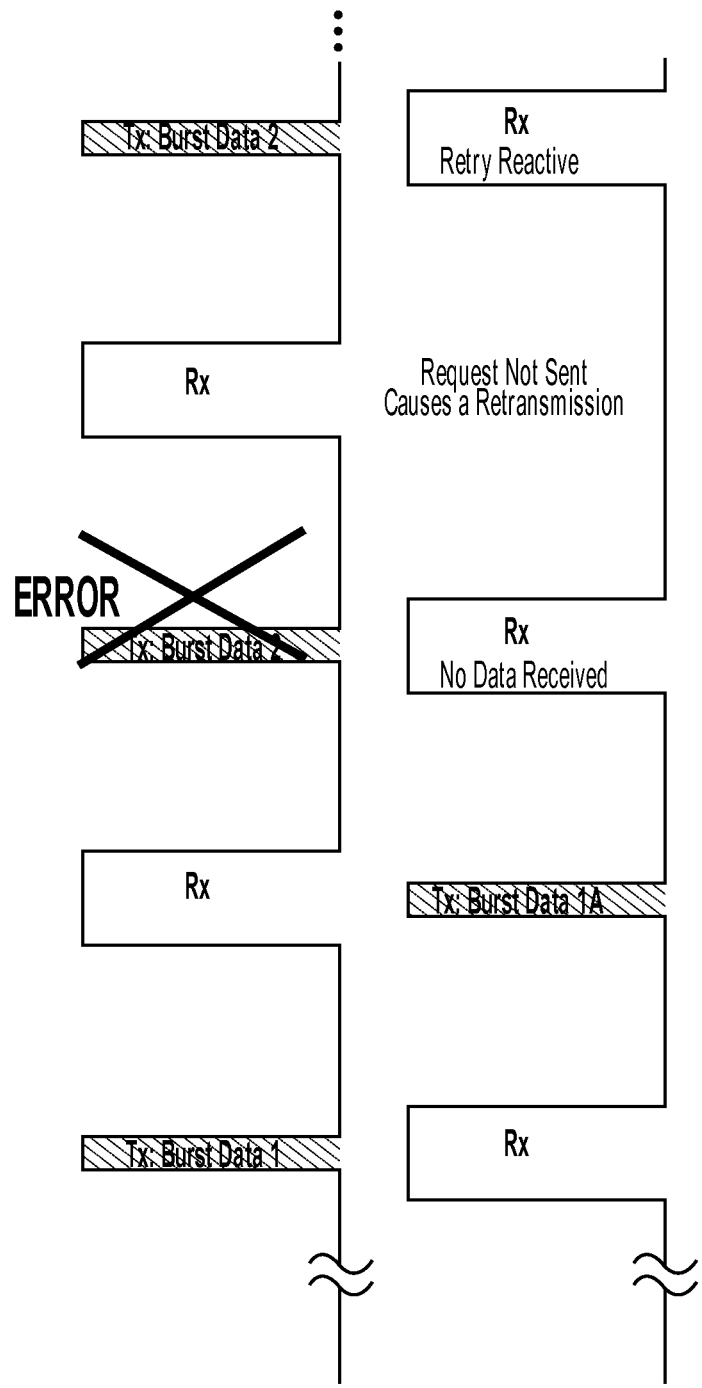
FIG. 7 is a signal diagram illustrating an exemplary burst transfer data error associated with a burst communication.
Figure 8:
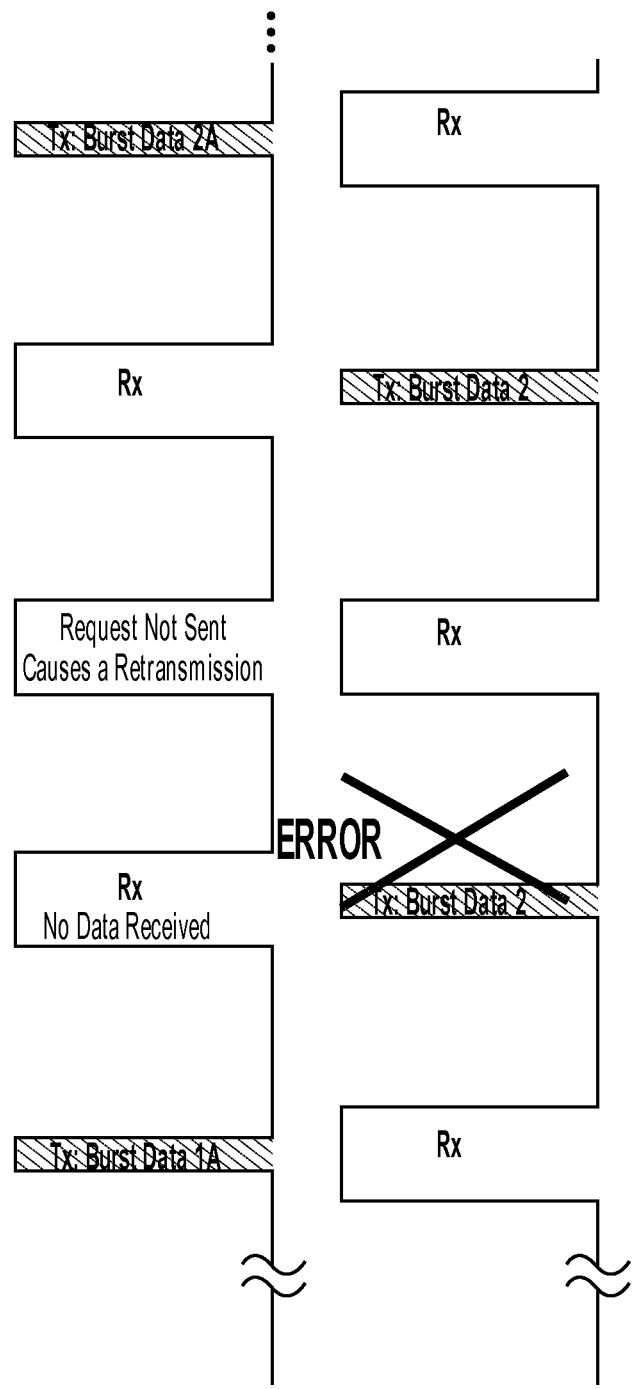
FIG. 8 is a signal diagram illustrating an exemplary burst transfer request error associated with a burst communication.

The nodes 12a, 12b may also verify the correct burst transmission of information utilizing their respective guard and/or activation windows 42. For example, as shown in FIG. 5, if the first node 12a transmits "Burst Data 1" the second node 12b may transmit an acknowledgment "Burst Data 1A." If an error is detected, as shown in FIG. 7, the second node 12b will not transmit an acknowledge causing the first node 12a to re-transmit the isochronous signal for reception by the second node 12b or reset the burst transmission and/or channel. The data rates associated with the burst transmissions may be negotiated by the first node 12a and second node 12b through bi-directional communication before or during burst transmissions.

Further, in some embodiments the first node 12a and second node 12b may be additionally or alternatively configured to access their respective memories 22 and interfaces 20 for burst transmissions. In such embodiments, the first node 12a may broadcast one-half of the data and the second-node may broadcast the other half of the data in combination to effectively double the data transmission rate without modifying the respective isochronous transmission periods of the nodes 12a, 12b.

The burst transmission discussed above may be employed in addition to the non-burst communication methods discussed above due to the varying isochronous transmission periods and other transmission characteristics that may be employed for burst channels and non-burst channels. Thus, in some embodiments, the first node 12a, or other transmitting units, may be operable to transmit any type of communication at every isochronous period and optionally receive, while the second node 12b, or other receiving units, can receive or transmit any type of communication on every isochronous period.

Upon reception of information, the second node 12b may retransmit the received information as discussed above. The second node 12b may additionally or alternatively retain received information within the memory 22 or provide received information to other devices and systems through the interface 20. Further, the processing system 16 associated with the second node 12b may process information before storage within the memory 22 or connection with other devices and systems through the interface 20.

As shown in FIG. 1, the network 10 may include any number of nodes 12 each configured as transmitters, receivers, or transmitters and receivers. Thus, the network 10 may include nodes 12 configured in a similar manner to the first node 12a, in a similar manner to the second node 12b, or in any other manner discussed herein. Several isochronous transmission channels may be established within the network 10 without interference due to the ability of the nodes 12 to vary the isochronous transmission period or other transmission characteristics of transmitted signals. Additional transmitting and receiving nodes 12 may be added to the network 10 without interfering with any existing nodes 12 due to the dynamic nature of the utilized transmission characteristics. Each of the nodes 12 comprising the network 10 may independently track the transmissions of transmitting nodes to identify utilized isochronous transmission characteristics and properly receive signals using a minimum amount of power.

Due to the ability to vary isochronous transmission periods, phases, frequencies, and other transmission characteristics, different nodes 12 within the network 10 may utilize very different transmission characteristics based on the requirements of the particular transmitting node 12. For example, a heart rate sensor may transmit data once per second to maintain a necessary minimum data latency, while a temperature sensor associated with the heart rate sensor may only transmit once every five seconds to meet a slower data latency requirement.

In embodiments where more than one node 12 attempts to transmit to another node 12 during the same isochronous period, the transmitting nodes 12 may cooperate to avoid transmitting interfering signals. In some embodiments, each transmitting node 12 may wait a random number of isochronous periods before attempting to communicate with another node 12 to reduce the probability of conflicting signals. Additionally or alternatively, the receiving node 12 may provide a fixed and unique sub sample period to each transmitting node 12 to prevent signal interference. The sub sample periods may be static values defined in the memory 22 or through the interface 20 or be dictated by one or more transmitting nodes 12.

Signal interference can also be reduced by assigning a unique address to each receiving node 12 utilizing the message format 24. The node addresses may be used to produce different offsets in time from an isochronous transmission or isochronous transmission period. The node addresses may be static and pre-defined values or dynamic values assigned by the transmitting nodes 12. Receiving nodes 12 may process the message as the intended recipient as well as transmit an acknowledgment back to the transmitting nodes 12 at the time or offset defined by the message format 24. Thus, in some embodiments, the guard window 36 associated with transmitting nodes may be dynamically increased or decreased depending on the number of receiving units. In some embodiments, the guard window 36 may have a static duration operable to receive acknowledgments from a fixed number of receiving units.

Additionally or alternatively, addressing may be utilized to control how receiving nodes respond to transmitting nodes. For example, the first node 12a may transmit a repeating isochronous signal having a first device address indicated by the message format 24. The second node 12b may receive the repeating isochronous signal and process the first device address to see if it corresponds to its own address. If the device address identified in the message format 24 corresponds to the address of the second node 12b, the second node 12b may enable all types of communication methods with the first node 12a. Consequently, nodes 12 not associated with the first device address, or other address or identifier, will not reply during the guard window 36, thus rendering it unnecessary to utilize large-duration guard windows 36.

As discussed above, transmitting nodes such as the first node 12a may be configured to receive signals broadcast by other nodes 12. In some embodiments, the transmitting nodes may be operable to transmit a first repeating isochronous signal, as discussed above, and receive a second repeating isochronous signal. The processing system 16 associated with a transmitting node may estimate an isochronous frequency of the second repeating isochronous signal and adjust the isochronous frequency of the first repeating isochronous signal based on the estimated isochronous frequency of the second repeating isochronous signal. Such a configuration enables interference between the first and second repeating isochronous signals to be avoided or limited. The processing system 16 may be configured to estimate the isochronous frequency of a plurality of received repeating isochronous signals, such that the present invention is not limited to decreasing interference between only two signals.

The processing system 16 may estimate the isochronous frequency of the second repeating isochronous signal utilizing any of the methods discussed above regarding the first node 12a and/or second node 12b. Thus, for example, the processing system 16 may track the second repeating isochronous signal over time and estimate the isochronous frequency based on various measurements.

Thus, as is discussed above, the processing system 16 may determine a difference between an expected and actual time to identify the clock error and then estimate the isochronous frequency of the second repeating isochronous signal based on the identified clock error. The processing system 16 may also estimate the isochronous frequency of the second repeating isochronous signal utilizing only one period of the second repeating isochronous signal such that it is not necessary to track the second repeating isochronous signal over an extended period of time or access information and data represented by the second repeating isochronous signal.

The processing system 16 may adjust the isochronous frequency of the first repeating isochronous signal over a plurality of transceiver transmissions so as to enable the receiving nodes 12 to continue to track and receive the first repeating isochronous signal. Thus, for any given period, the instantaneous change in the isochronous frequency of the first repeating isochronous signal may be limited by the activation windows 42 error allowance utilized by receiving nodes 12 to ensure that the first repeating isochronous signal may continue to be received.

The adjustment to the isochronous frequency of the first repeating isochronous signal performed by the processing system 16 is variable such that it is not limited to static or predefined values. Thus, the processing system 16 may adjust the isochronous frequency of transmitted signals by any amount to limit interference while remaining within the bounds defined by the activation windows 42 error allowance.

The processing system 16 may also be adapted to variably adjust the isochronous phase of transmitted repeating isochronous signals, such as the first repeating isochronous signal, based on one or more transmission characteristics of received signals, such as the second repeating isochronous signal or other isochronous and non-isochronous signals. The isochronous phase adjustment performed by the processing system 16 may be performed in addition to, or as an alternative to, the frequency adjustment discussed above.

The transmission characteristic utilized by the processing system 16 to adjust the isochronous phase of transmitted repeating isochronous signals may be any characteristic that corresponds to the signal but not necessarily the data or information represented by the signal. Thus, for example, the processing system 16 may identify and utilize transmission characteristics such as frequency, phase, power, amplitude, duration, modulation, combinations thereof, and the like. The processing system 16 may adjust the isochronous phase of transmitted repeating isochronous signals to avoid interference with other signals, to form a desired sparse or dense network channel topology, and/or to enable receiving nodes to request a more appropriate or usable isochronous phase.

In a similar manner to the isochronous frequency adjustment discussed above, the processing system 16 may adjust the isochronous phase of transmitted repeating isochronous signals over a plurality of transceiver transmissions so as to allow receiving nodes 12 to continue to track and receive the transmitted repeating isochronous signals. For any given period, the change in the isochronous phase of a transmitted repeating isochronous signal may be limited by the activation windows 42 error allowance utilized by receiving nodes 12 to ensure that transmitted repeating isochronous signals may continue to be received.

The adjustment to the isochronous phase of transmitted isochronous signals performed by the processing system 16 is variable such that it is not limited to static or predefined values. Thus, the processing system 16 may adjust the isochronous phase of transmitted signals by any amount to limit interference while remaining within the bounds defined by the activation windows 42. However, the interference avoidance methods employed by the processing system 16 may include a static, measured, or random correction to the isochronous frequency, the phase, or both the isochronous frequency and phase of isochronous transmissions.

The various nodes 12 and network 10 may be employed in any environment to enable low-power network communications. In some embodiments, various nodes 12 may be coupled with heart rate monitors, bicycles, speed sensors, motion sensors, pedometers, accelerometers, and the like to transmit real-time data to devices such as watches, cellular phones, personal digital assistant, computing devices, combinations thereof, and the like. The nodes 12 may also be utilized in a home automation network where alarm sensors, temperature sensors, light switches, power outlets, and the like may be controlled and monitored from a central location such as a remote control or computing device. The nodes 12 may further be utilized to retransmit data to a central location, such as in a warehouse of radio-frequency identification (RFID) devices, where either due to distance or environment, radio-frequency communication cannot be achieved from the central location to all items in the warehouse. The nodes 12 may also be used to allow RFID information, or any other data, to be hopped from one wireless node to another and back to the central location.

The nodes 12 may be coupled with any devices and systems to form any type of network or combination of networks. For example, the nodes 12 may be utilized in combination with: computers; computer peripherals such as mice and keyboards; video conference equipment such as video monitors, microphones, audio speakers, and cameras; remote controls for any devices and systems including consumer electronic products; video game equipment such as joysticks and interactive remotes; security systems including security alarms, intrusion detectors, personal security alarms, electronic motion detectors; electrical and heating systems including controllers, thermostats, heating wires; wireless devices such as keypads; child monitoring systems; fire and smoke detectors and alarms; personal transponders; garage door openers; combinations thereof; and the like.

It is believed that embodiments of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method of transmitting network communications, the method comprising:
   wirelessly transmitting a first repeating isochronous signal;
   receiving a signal, wherein the received signal is a second repeating isochronous signal and the transmitted and received isochronous signals are each a data message signal;
   identifying a transmission characteristic of the second repeating isochronous signal;
   variably adjusting the isochronous phase of the first repeating isochronous signal based on a transmission characteristic of the received signal;
   defining an activation window based on the identified transmission characteristic;
   receiving the second repeating isochronous signal during the activation window; and
   adjusting the activation window by detecting changes in the identified transmission characteristic of the second repeating isochronous signal.

2. The method of claim 1, wherein the transmission characteristic is selected from the group consisting of isochronous frequency, isochronous phase, power, amplitude, duration, modulation, and combinations thereof.

3. The method of claim 1, further including adjusting the isochronous frequency of the first repeating isochronous signal.

4. The method of claim 1, wherein the isochronous phase of the first repeating isochronous signal is randomly adjusted.

5. The method of claim 1, wherein the isochronous phase of the first repeating isochronous signal is adjusted over a plurality of transmissions.

6. A wireless network node, comprising:
   a transceiver configured to wirelessly transmit a first repeating isochronous signal and receive a second repeating isochronous signal, wherein the transmitted and received isochronous signals are each a data message signal; and
   a processing system coupled with the transceiver, the processing system configured to—
   estimate an isochronous frequency or phase of the second repeating isochronous signal,
   define an activation window based on the estimated isochronous frequency or phase of the second repeating isochronous signal,
   control the transceiver to receive the second repeating isochronous signal during the activation window,
   adjust the activation window by detecting changes in the isochronous frequency or phase of the second repeating isochronous signal, and
   adjust the isochronous frequency or phase of the first repeating isochronous signal based on the estimated isochronous frequency or phase of the second repeating isochronous signal.

7. The node of claim 6, wherein the processing system is configured to limit interference with the second repeating isochronous signal by adjusting the isochronous frequency of the first repeating isochronous signal.

8. The node of claim 6, wherein the processing system is configured to adjust the isochronous frequency of the first repeating isochronous signal over a plurality of transceiver transmissions.

9. A wireless network, comprising:
   a first wireless network node including—
   a transceiver configured to wirelessly transmit a first repeating isochronous signal and receive a signal, wherein the received signal is a second repeating isochronous signal and the transmitted and received isochronous signals are each a data message signal; and
   a first processing system coupled with the transceiver, the first processing system configured to variably adjust the isochronous phase of the first repeating isochronous signal based on a transmission characteristic of the received second repeating isochronous signal; and
   a second wireless network node including—
   a receiver configured to wirelessly receive the first repeating isochronous signal, and
   a second processing system coupled with the receiver, the second processing system configured to—
   identify a transmission characteristic of the first repeating isochronous signal,
   define an activation window based on the identified transmission characteristic,
   control the receiver to receive the first repeating isochronous signal during the activation window, and
   adjust the activation window by detecting changes in the identified transmission characteristic of the first repeating isochronous signal.

10. The network of claim 9, wherein the second processing system is configured to activate the receiver at the beginning of the activation window and deactivate the receiver at the end of the activation window.

11. The network of claim 9, wherein the transmission characteristic of the first repeating isochronous signal is selected from the group consisting of isochronous frequency, isochronous phase, power, amplitude, duration, modulation, and combinations thereof.

12. The network of claim 9, wherein the transceiver is configured to transmit the first repeating isochronous signal during a transmission window and receive the received signal only during a guard window, the guard window being in proximity in time to the transmission window.

13. The network of claim 9, wherein the receiver includes a transmitter configured to transmit signals for reception by the transceiver of the first wireless network node.

14. The network of claim 13, wherein the second network node transmits the second repeating isochronous signal.

\* \* \* \* \*